United States Patent Office 3,518,291
Patented June 30, 1970

3,518,291
ORGANOMETALLIC AMINOSILICON
COMPOUNDS
John L. Speier, Midland, Mich., assignor to Dow Corning Corporation, Midland, Mich., a corporation of Michigan
No Drawing. Original application Dec. 5, 1966, Ser. No. 598,892, now Patent No. 3,445,425. Divided and this application Oct. 16, 1968, Ser. No. 796,250
Int. Cl. C07d 103/04; C07f 7/10
U.S. Cl. 260—448.2                    2 Claims

ABSTRACT OF THE DISCLOSURE

A compound of the formula:

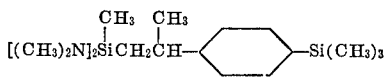

is useful in making silica and glass water repellant and a compound of the formula:

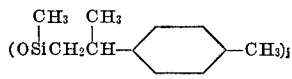

where $j$ is 3 or 4 is useful in making siloxane copolymers which are lubricants.

---

This is a division of application Ser. No. 598,892, filed Dec. 5, 1966, now U.S. Pat. No. 3,445,425.

This invention relates to an organoaminosilane and a cyclic organosiloxane which are derivatives of organometallic aminosilicon compounds.

It is known in the art that organometallic reagents are reactive with electronegative groups. The Grignard reagents are excellent examples of this reactivity, see "Grignard Reactions of Non-Metallic Substances" by M. S. Kharasch and O. Reinmuth, Prentice-Hall, Inc., New York (1954) and "Organo-Metallic Compounds" by G. E. Coates, Second Edition, 1960, John Wiley and Sons, Inc., New York.

The use of organometallic reagents in the preparation of silicon compounds have been known for a long time. In 1863. Friedel and Crafts prepared tetraethylsilane by the reaction of tetrachlorosilane and diethylzinc. In 1904, the Grignard reagents were used to form silicon-carbon bonds by reacting chlorosilanes with R*MgX where R* is a hydrocarbon radical and X is a halogen atom. These and other reactions of organometallic reagents with silicon compounds are discussed by C. Eaborn in "Organo-Silicon Compounds," 1960, Butterworths Scientific Publications, London.

Eaborn shows that Grignard reagents react with silicon-halides, silicon-alkoxides, silicon-hydrides, siloxanes and silicon-pseudohalides containing compounds to give the normal Grignard products, pages 11 to 19. Eaborn also shows that organolithium reagents react even more readily with silicon-halides, silicon-alkoxides and silicon-hydrides to give products wherein the organo group of the organolithium reagent replaces the electronegative group on the silicon atom, pages 19 to 21. Eaborn also shows that organosodium, organopotassium, organozinc, organo-aluminum, and organomercury reactt with the silicon-halides, silicon alkoxides and the like, as do the Grignard reagents and the organolithium reagents.

Thus, the art clearly recognizes that organometallic reagents of the type R*-metal react very well with electronegative groups attached to a silicon atom. The reaction ≡Si—Y+R*—metal→ ≡SiR*+metal—Y where Y is an electronegative group, has been used very extensively for the synthesis of useful organosilicon compounds, especially when the metal is Li, Na, K, Mg, Al, Zn and Hg. The first five metals are the most widely used and are also used commercially.

Since organometallic reagents react so well with electronegative groups on silicon, an organometallic reagent having a ≡Si—Y group is unknown. Eaborn sums this up very nicely on page 392.

"There can be no hope, for example, of preparing a Grignard reagent from a chloroalkylsilicon compound containing a normally reactive Si—Cl bond (e.g. ClMe₂SiCH₂Cl) since if any of the reagent were formed it would immediately be destroyed by interaction with this bond. Nor can such a compound be exposed to nucleophilic reagents without preferential reaction at the Si—Cl bond."

It is also known that organolithium reagents react with vinyltriorganosilanes to form lithium reagents and polymers, L. F. Cason and H. G. Brooks, Journal of the American Chemical Society, vol. 74, 1952, pages 4582–4583; L. F. Cason and H. G. Brooks, Journal of the Chemical Society, vol. 19, 1954, pages 1278–1282 and M. S. Nametkine, A. V. Topchiev and S. G. Dourgarian, Journal of Polymer Science, Part C, No. 4, 1963, pages 1053–1059.

The applicant has unexpectantly found organometallic compounds which contain an electronegative group on a silicon atom which provide novel derivatives from organometallic aminosilicon compounds. These and other objects will become apparent from the folowing detailed description of the invention.

This invention relates to a compound of the formula:

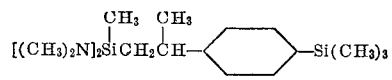

This invention also relates to a compound of the formula

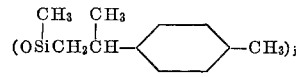

wherein $j$ is an integer from 3 to 4 inclusive.

The organometallic aminosilicon compounds are unique in that they contain both a silicon-nitrogen linkage and a carbon-metal linkage in the same compound. The organometallic aminosilicon compounds of the present invention can be monomers, dimers, trimers, tetramers, polymers and copolymers of two or more monomeric units.

The organometallic aminosilicon compounds are compounds in which each compound has at least one —SiR_a(NR')_m group and at least one radical bonded to a —SiR_a(NR')_m group through a silicon-carbon bond, in which there is a carbon-metal bond.

In the —SiR_a(NR'_2)_m, R is a monovalent radical bonded to the silicon atom through a silicon-carbon bond and composed of carbon, hydrogen, nitrogen, silicon or oxygen atoms wherein the nitrogen atoms are bonded either to carbon or silicon or both carbon and silicon and the oxygen atoms are present only as ether linkages, a specific example of R is an alkyl radical, such as methyl.

In the —SiR$_a$(NR′$_2$)$_m$ group, R′ is a monovalent radical bonded to the nitrogen atom through a silicon-nitrogen bond or a carbon-nitrogen bond and composed of carbon, hydrogen, nitrogen, silicon or oxygen atoms wherein the nitrogen atoms are bonded either to carbon or silicon or both silicon and carbon and the oxygen atoms are present only as ether linkages. A specific example of R is a methyl radical.

The —SiR$_a$(NR′$_2$)$_m$ group can be, for example, $$—Si[N(CH_3)_2]_3$$

per silicon atom and 1 to 3 —NR′$_2$ radicals per silicon atom.

The —SiR$_a$(NR′$_2$)$_m$ group is attached to one radical, bonded through a silicon-carbon linkage. The sum of $a+m$ is 3. This radical is an organic radical composed of carbon and hydrogen. This radical has a M- carbon bond where M is a metal or metal group of Li, Na, K, Al, Pt, Pb, Mg, Hg, Cd, Zn, MgR, MgX, HgR, HgX, PbX, PbR, PbX$_3$, PbX$_2$R, PbXR$_2$, PtXR$_2$, PtX(PR$_3$)$_2$, AlX$_2$, AlXR, AlR$_2$, CdR, CdX or ZnX, ZnR where X is a halogen atom such as chlorine, bromine, iodine or fluorine.

Examples of these radicals, of the type —R‴—M, are as follows:

$$—CH_2\overset{CH_3}{\underset{|}{C}H}—\langle\phantom{X}\rangle—Na \quad , \quad —CH_2\overset{CH_3}{\underset{|}{C}H}—\langle\phantom{X}\rangle—CdBr$$

The organometallic aminosilicon compounds are free of —C≡CH groups, because these groups destroy the metal-carbon bond.

The organometallic aminosilicon compounds can be made by several different methods. The best modes of preparation are included in the following discussion.

The organolithium aminosilicon compounds can be prepared by a process which comprises (I) contacting under essentially anhydrous conditions a (diorganoamino) silicon compound of the formula $$R″_b\overset{R_{4-b-m}}{\underset{|}{Si}}(NR′_2)_m$$

wherein R and R′ are defined above, R″ is a monovalent hydrocarbon radical selected from the group consisting of vinyl radicals, conjugated unsaturated aliphatic radicals and conjugated unsaturated aromatic-aliphatic radicals, $b$ is an integer from 1 to 3, $m$ is defined above and the sum of $b+m$ has a maximum of 4, and an organolithium compound of the formula Li—R where R is defined above and thereafter (II) recovering the organolithium (diorganoamino) silicon compound.

This process for preparing the organolithium(diorganoamino) silicon compounds can be carried out at room temperature, below room temperature or by heating the contacted mixture. The (diorganoamino) silicon compound is contacted by the organolithium compound in the presence of an inert organic solvent. The inert organic solvent is inert to reactions with the other ingredients present. Examples of some of the inert organic solvents include, diethyl ether, tetrahydrofuran, toluene, benzene, xylene, dioxane, hexane, methyl isopropylether, octane, dibutylether, hexylmethylether and isobutylmethyl ether.

R″ is a monovalent hydrocarbon radical selected from the group consisting of vinyl radicals, conjugated unsaturated aliphatic radicals and conjugated unsaturated aliphatic-aromatic radicals such as 1,3-butadienyl, 1,3-hexadienyl, 3-methylbuta-1,3-dienyl, $$CH_2=\overset{CH_2CH_2CH_3}{\underset{|}{C}}—CH—CH—\langle\phantom{X}\rangle—$$

1,3-cyclopentadienyl, 1,3-cyclopentadienyl, 4-ethyl-1,3-cyclopentadienyl $$CH_2=CH—\langle\phantom{X}\rangle— \quad, \quad CH_2=C(CH_3)—\langle\phantom{X}\rangle—,$$

$$CH_2=CH—CH—CH—\langle\phantom{X}\rangle—1,3,5\text{-hexatrienyl}$$

$$—CH—CH—\overset{CH_2}{\underset{\|}{C}}—CH_2CH_2CH_2CH_3, —CH—CH—\overset{\|}{\underset{CH_2}{C}}—CH—CH_2,$$

$$CH_2=CH—\langle naphthyl \rangle \quad, \quad CH_2=CH—\langle\phantom{X}\rangle—CH_3,$$

$$\text{and } CH_2=CH—\langle\phantom{X}\rangle\overset{CH_3}{\underset{CH_3}{|}}$$

The silane $$R″_b\overset{R_{4-b-m}}{\underset{|}{Si}}(NR′_2)_m$$

can be mixed with Li—R to produce an organolithium amino silicon compound of the formula $$(MR‴)_b\overset{R_{4-b-m}}{\underset{|}{Si}}(NR′_2)_m$$

wherein the variables are defined above. R‴ is a divalent organic radical bonded to M through a M-carbon bond and to Si through a Si-carbon bond and composed of carbon, hydrogen, nitrogen, silicon or oxygen in the form of ether linkages. Preferably the silane and Li—R are mixed in the presence of an inert organic solvent. The system is also preferably anhydrous in that moisture destroys Li—R and additional quantities are therefore needed if moisture is present.

The organolithium aminosilicon compound can be recovered by well-known methods, such as by crystallization, precipitation, distillation and solvent evaporation. However, the by-products are usually salts and can readily be removed by filtration and the organolithium aminosilicon compound can be used in the solvent solution in which it is prepared.

The silanes $$R″_b\overset{R_{4-b-m}}{\underset{|}{Si}}(NR′_2)_m$$

can be readily prepared by contacting a halosilane of the formula $$R″_b\overset{R_{4-b-m}}{\underset{|}{Si}}X_m$$

with the desired amine, HNR′$_2$, both can be purchased commercially or can be prepared by well-known methods, preferably in excess to obtain high yields and ensure complete replacement of the halogen atoms.

A useful variation of the above process is a method of making copolymers wherein along with the silane $$R″_b\overset{R_{4-b-m}}{\underset{|}{Si}}(NR′_2)_m$$

unsaturated conjugated organic compounds are added. These unsaturated conjugated organic compounds can be for example, styrene, alpha-methylstyrene, isoprene, vinylnaphthylene, butadiene, vinyltoluene, 1,3-hexadiene, divinylbenzene, vinylxylene, cyclobutadiene, 1,3-cyclopentadiene, and CH$_3$CH$_2$OCH$_2$CH=CHCH=CH$_2$.

The above reaction is preferably carried out under an inert atmosphere, such as helium or nitrogen.

Another method for the preparation of the organometallic aminosilicon compounds is the reaction of

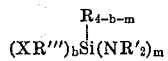

with magnesium under anhydrous conditions, usually in an inert organic solvent such as an ether. The conventional Grignard conditions can be used. The products are organomagnesium aminosilicon compounds of the formula

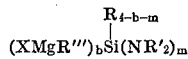

Organometallic aminosilicon compounds, other than where the metal is lithium or magnesium can be prepared by reacting the appropriate metal halide, organometal halide or metal with the organolithium or organomagnesium aminosilicon compound. For example $AlCl_3$ can be added to

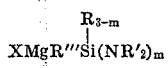

to give

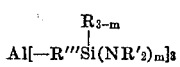

or $HgBr_2$ can be added to

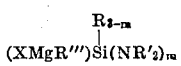

to give

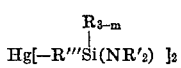

Instead of $AlCl_3$ and $AlX_3$, $RAlX_2$ or $R_2AlX$ can be used. Similarly $HgX_2$ or $RHgX$ can be used, as well as $CdX_2$, $RCdX$, $ZnX_2$, $PbX_2$, $R_2PtX_2$ or $RZnX$. In a similar manner any

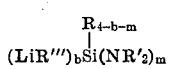

can be reacted with Na, K, $AlX_3$, $R_2AlX$, $HgX_2$, and any of the other metal halogen compounds described above to give the corresponding organometallic aminosilicon compound. X and R are defined above. Any of the conventional methods and techniques for preparing organoaluminum, organomercury, organocadmium, organozinc, organosodium or organopotassium can be used to prepare the corresponding organometallic aminosilicon compounds.

A hydrolysis derivative of an organonmetallic aminosilicon compound of the formula

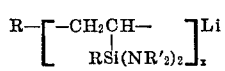

Hydrolyzed with dilute hydrochloric acid or acetic acid, produces a new compound of the formula

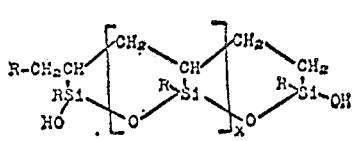

These silicon polymers can be used as thermoplastic coatings and for fibers.

The organometallic aminosilicon compounds are useful to prepare silanes and siloxanes having new carbon functional groups as well as functional silicon groups. The M—C bond can undergo any of the normal reactions without disturbing the $SiNR'_2$ group, therefore the carbon portion of an organosilicon compound can be altered by reactions which under other conditions, such as when SiCl is present, could not be done. After the organo portion is altered, the $SiNR'_2$ can then be converted to the other silicon functional groups such as SiCl, SiOH, SiOR and the like. The result is that an entire new area of organosilicon compounds has been developed, which provides the silicone art with one of the most useful tools in preparing difficult to prepare compound, by an easy to use method.

The following examples are illustrative only of this invention and should not be construed as limiting the scope thereof, which is properly delineated in the appended claims.

For a better understanding of the present invention, the following information is given.

Instrumental analysis.—Commercial instruments were used for vapor phase chromatographic analyses, nuclear magnetic resonance analyses, infrared analyses, gas liquid chromatographic analyses, boiling points and melting points.

Solvents.—Commercial hexane and pentane were washed with concentrated sulfuric acid and stored over molecular sieves. Tetrahydrofuran was used as purchased and the thiophene-free benzene was azeotropically dried before use.

EXAMPLE (A) In an apparatus having a three-necked flask, condenser, magnetic stirrer, condenser, addition funnel and protected from moisture by a $CaSO_4$ drying tube, 2.0 g. of magnesium turnings (0.08 mole) were placed. The apparatus was flame dried. 55 ml. of diethylether and 16.5 g. (0.05 mole) of

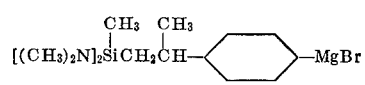

was added. The reaction did not begin so 30 ml. of the diethylether was removed by distillation and 30 ml. of tetrahydrofuran was added. At 45° C. an exothermic reaction began and produced a black solution and consumed the magnesium. The resulting product was

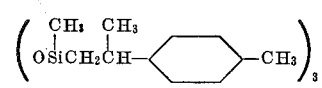

10 g. of methyliodide was added and a precipitate developed. The salts were filtered and washed with dry diethylether. The filtrate and wash were combined and concentrated.

The concentrate was hydrolyzed with water and distillation of the hydrolyzate yielded a mixture of

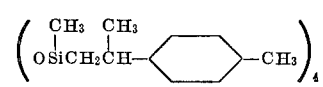

and

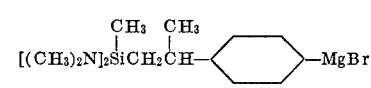

The products were identified by nuclear magnetic resonance.

(B) A solution of 0.05 mole of

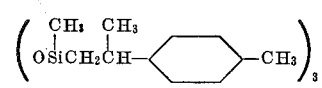

in tetrahydrofuran was prepared as described above in (A) and added to 0.15 mole of $(CH_3)_3SiCl$. The product was recovered as described above and was shown by nuclear magnetic resonance to be

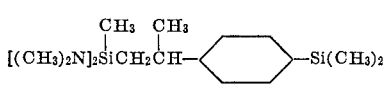

2. A compound of the formula

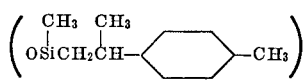

wherein $j$ is an integer from 3 to 4 inclusive.

| Silane | Product |
|---|---|
| (a) $ClCH_2CH_2Si[N(C_2H_5)_2]_3$ | $ClMgCH_2CH_2Si[N(C_2H_5)_2]_3$ |
| (b) $BrCH_2CH_2CH_2Si(N[C(CH_3)_3]_2)_3$ | $BrMgCH_2CH_2CH_2Si(N[C(CH_3)_3]_2)_3$ |
| (c) $ICH_2CH_2-\langle\rangle-Si[N(CH_3)(C_6H_{11})]_3$ | $IMgCH_2CH_2-\langle\rangle-Si[N(CH_3)(C_6H_{11})]_3$ |
| (d) $BrCH_2(CH_2)_{17}Si[N(CH_3)(\text{naphthyl})]_3$ | $BrMgCH_2(CH_2)_{17}Si[N(CH_3)(\text{naphthyl})]_3$ |
| (e) $ClCH_2(CH_2)_{10}Si[NCH_2CH_2CH_2CH_2N(CH_3)_2]_3$ (CH$_3$) | $ClMgCH_2(CH_2)_{10}Si[NCH_2CH_2CH_2CH_2N(CH_3)_2]_3$ (CH$_3$) |
| (f) $ClCH_2CH(CH_3)CH_2Si[N(CH_2CH_2CH_2OCH_2CH_3)_2]_3$ | $ClMgCH_2CH(CH_3)CH_2Si[N(CH_2CH_2CH_2OCH_2CH_3)_2]_3$ |
| (g) $Br-\langle\rangle-CHCH_2Si[N-\langle\rangle-Si(CH_3)_3]_3$ (CH$_3$, CH$_3$) | $BrMg-\langle\rangle-CHCH_2Si[N-\langle\rangle-Si(CH_3)_3]_3$ (CH$_3$, CH$_3$) |
| (h) $ClCH_2CH_2-\langle\rangle-Si[NSi(CH_3)_3]_3$ (CH$_3$) | $ClMgCH_2CH_2-\langle\rangle-Si[NSi(CH_3)_3]_3$ (CH$_3$) |

That which is claimed is:

1. A compound of the formula:

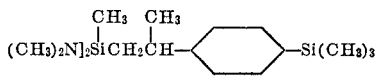

References Cited

UNITED STATES PATENTS 3,146,250  8/1964  Speier _____ 260—448.2

TOBIAS E. LEVOW, Primary Examiner

A. P. DEMERS, Assistant Examiner

U.S. Cl. X.R.

260—448.2